United States Patent
Matsumoto

(10) Patent No.: US 7,342,953 B2
(45) Date of Patent: Mar. 11, 2008

(54) SYNCHRONIZATION DETECTION CIRCUIT

(75) Inventor: Toshiaki Matsumoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 628 days.

(21) Appl. No.: 10/335,938

(22) Filed: Jan. 3, 2003

(65) Prior Publication Data

US 2003/0152138 A1  Aug. 14, 2003

(30) Foreign Application Priority Data

Feb. 8, 2002  (JP)  ............ P. 2002-032877

(51) Int. Cl.
*H04B 1/00* (2006.01)

(52) U.S. Cl. .............. 375/152; 375/354; 375/359; 327/141

(58) Field of Classification Search .......... 375/130, 375/142, 143, 145, 150, 152, 354, 355, 357, 375/362, 367, 373, 140, 141, 365, 371, 359; 327/141, 144, 147, 100, 146
See application file for complete search history.

(56) References Cited

U.S. PATENT DOCUMENTS

| | | | |
|---|---|---|---|
| 5,508,708 A * | 4/1996 | Ghosh et al. | 342/457 |
| 5,790,590 A * | 8/1998 | Shou et al. | 375/152 |
| 5,903,595 A | 5/1999 | Suzuki | |
| 6,064,688 A * | 5/2000 | Yanagi | 375/149 |
| 6,236,696 B1 * | 5/2001 | Aoki et al. | 375/376 |
| 6,522,366 B1 * | 2/2003 | Onodera et al. | 348/638 |
| 2006/0161370 A1 * | 7/2006 | Jiang et al. | 702/107 |

FOREIGN PATENT DOCUMENTS

| | | |
|---|---|---|
| CN | 1052355 C | 5/2000 |
| JP | 1-319341 | 12/1989 |
| JP | 5-175938 | 7/1993 |
| JP | 10-56404 | 2/1998 |
| JP | 10-173485 | 6/1998 |
| JP | 10-257018 | 9/1998 |
| JP | 11-191746 | 7/1999 |
| JP | 11-261442 | 9/1999 |
| JP | 2000-307479 | 2/2000 |
| JP | 2000-174661 | 6/2000 |
| JP | P2000-252870 A | 9/2000 |
| JP | P2000-269855 A | 9/2000 |

OTHER PUBLICATIONS

Japanese Office Action issued in Japanese Patent Application No. 2002-427402, dated Apr. 18, 2007.

* cited by examiner

Primary Examiner—Chieh M. Fan
Assistant Examiner—Naheed Ejaz
(74) Attorney, Agent, or Firm—McDermott Will & Emery LLP

(57) ABSTRACT

A synchronization detection circuit includes: a matched filter 105 for outputting a correlation value, between a spreading code and data that is obtained by sampling a code spread signal 101, using a sampling clock for one chip cycle; a sampling clock generator 102 for generating the sampling clock, so that, for each cycle of a code spreading signal, a phase delay for the basic clock of one chip cycle is increased by a value obtained by dividing one chip cycle by an integer; and a synchronization determination unit 107 for determining the timing whereat the maximum correlation value is attained and for performing synchronization detection.

8 Claims, 9 Drawing Sheets

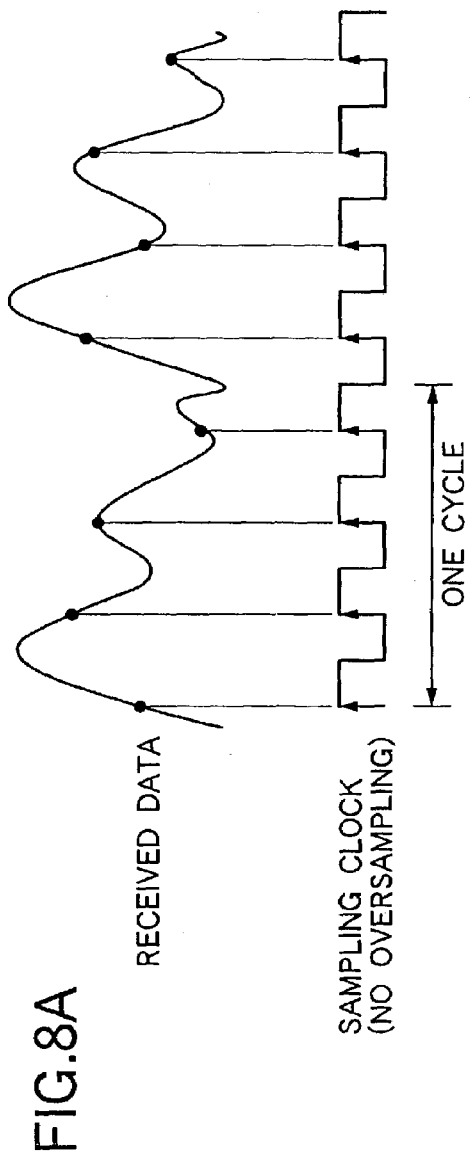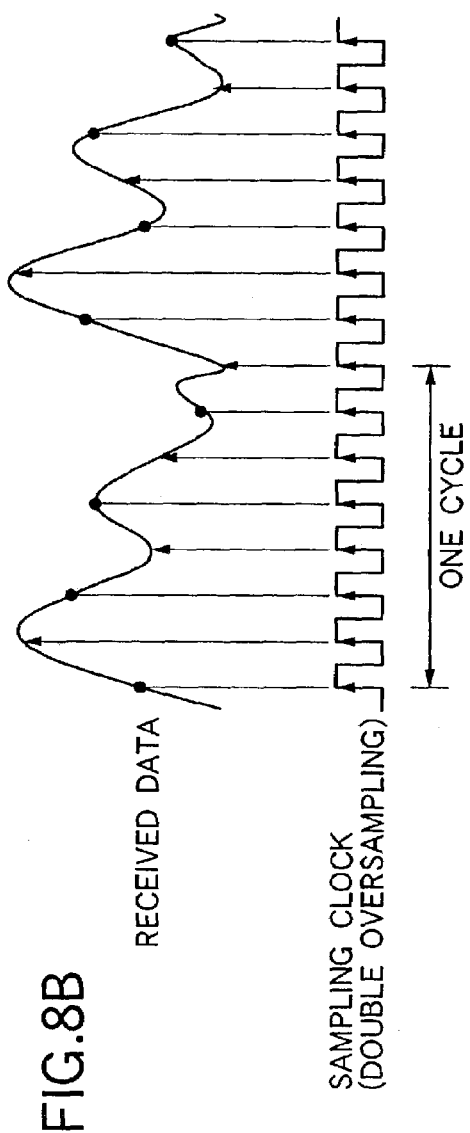

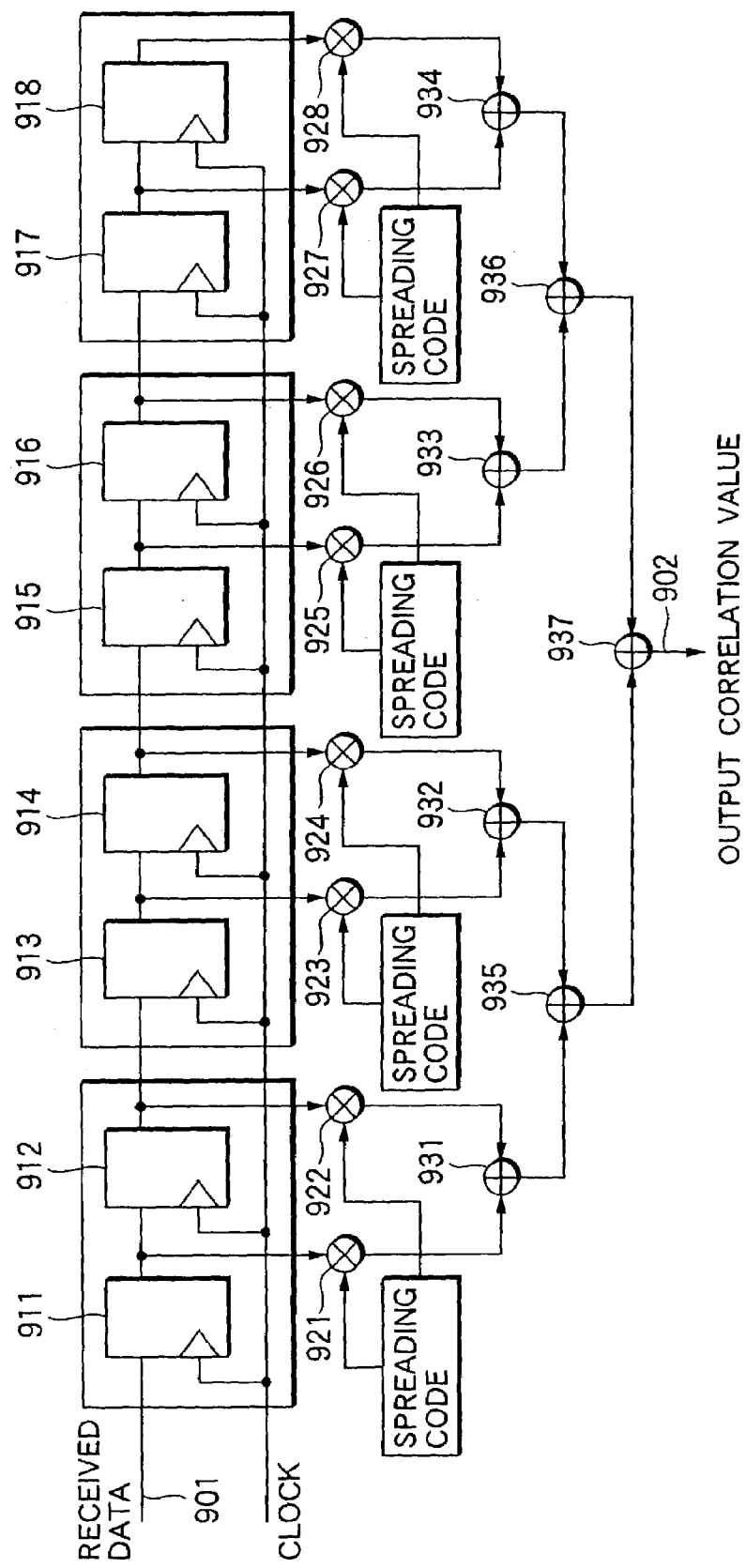

SYNCHRONIZATION DETECTION CIRCUIT

BACKGROUND OF THE INVENTION

The present invention relates to spread spectrum communication employing the code division multiple access (CDMA) system, and relates in particular to a synchronization detection circuit for the acquisition of synchronization between received signals.

For radio communication, when data to be transmitted is modulated and superimposed on a carrier wave, the bandwidth occupied is spread greater than several tens of times the original bandwidth of the data to be transmitted. This broadband modulation is generally called spread spectrum communication. For spread spectrum communication, a spreading code sequence is employed in order to perform spectrum spreading modulation to spread a frequency across a broad band. When the reception side performs despreading by employing the same spreading code that the transmission side used for the spectrum spreading modulation, the reception side can extract the original data that was transmitted.

As a result of spectrum spreading modulation, data to be transmitted is changed into a signal having a low power density and an extended frequency bandwidth. By despreading this signal, the original data is recovered as a signal having a high power density, while the narrow bandwidth interference wave that was superimposed along the communication path is provided as a broadband signal having a low power density. As is described above, the advantages of spread spectrum communication are low interference, high resistance to multi-path errors, and the maintenance of communication secrecy.

In a spread spectrum-direct sequence system for spread spectrum communication, the transmission side performs spectrum spreading modulation by multiplying data by a spreading code of a higher frequency, and the reception side performs despreading, by multiplying the received signal by the same spreading code, and extracts the original data. When the spreading code used by the transmission side and the reception side differs, the despreading result is a noise signal having a low power density. Therefore, when the transmission side employs a number of different spreading codes, signals for multiple channels can be transmitted at the same time and at the same frequency. The title employed for this connection system is code division multiple access (CDMA).

FIG. 4 is a diagram showing the concept of the spread spectrum-direct sequence system for spread spectrum communication. On the transmission side, the spectrum spreading modulation is performed when a multiplier 403 is used for the multiplication of digital data 401 by a spreading code 402. On the reception side, the despreading is performed when a multiplier 413 is used for the multiplication of the received signal by a spreading code 412, which is the same as the spreading code 402. As a result, the original digital data 401 is recovered as digital data 411.

FIG. 5 is a conceptual diagram for explaining the principles of the spectrum spreading modulation in FIG. 4A and the spectrum despreading in FIG. 4B. A spreading code sequence is a sequence wherein 1 and 0 appear at random, and a wave 502 where ±1 appears at random is employed as a corresponding spreading code wave. As is shown in FIG. 5, when the spectrum spreading modulation is performed for 2-bit data 501 by using spreading code 502 having a higher frequency, a signal 503 is obtained that has the same frequency as the spreading code 502. When this signal 503 is received as a signal 513, and is multiplied by a spreading code wave 512, which is the same as the one used for the transmission, the received data 511 that is obtained is the same as the original data.

As is described above, when the transmission side has multiplied at a specific timing a specific spreading code and data to be transmitted and has generated a spreading signal, the reception side can employ the same spreading code as was used for the transmission to multiply, at the same timing, the spreading signal and thus obtain the original data. For the extraction of the original data, the reception side must know the spreading code used by the transmission side and the timing at which it was used. Therefore, for synchronization, the transmission side repetitively transmits a spreading code across a specific channel. A matched filter is used as the circuit for finding the spreading code and the timing.

FIGS. 6A and 6B are diagrams for explaining the configuration of a matched filter. FIG. 6A is a diagram showing the process employed for sampling a received signal in accordance with a sampling clock and for obtaining received data (a sampling value). FIG. 6B is a block diagram showing the configuration of a matched filter. The matched filter comprises: a tap section, wherein multiple taps (flip-flops) 611 to 614 are connected in series to constitute a shift register; multipliers 621 to 624; and adders 631 to 633. In this embodiment, a matched filter having only four taps is employed. More taps, however, may be employed. Thus, if the spreading code consisted of 256 chips, 256 taps would be provided for the structure of the matched filter. A chip represents one unit of spreading code data, and in order to distinguish a bit of data to be transmitted or received, this data unit is called a chip.

In the thus structured matched filter, received data 601 is transmitted to the tap section, while shifting the data 601 by one sample. The multipliers 621 to 624 multiply the outputs of the taps by a spreading code that is generated by a code generator, and the adders 631 to 633 add the multiplication products to obtain an output correlation value 602. When the maximum output correlation value 602 is attained, at that point the timing for the received data most nearly matches the timing for the spreading code, and at that time synchronization is acquired.

FIGS. 7A to 7D are diagrams for explaining the principle employed for the acquisition of synchronization. In FIG. 7A, the spreading code and the timing are matched relative to the received data, and the maximum correlation value is attained. In FIG. 7B, the spreading code is not matched relative to the received data, and the correlation value is reduced. In FIG. 7C, the timing is not matched relative to the received data while the spreading code is matched, and the correlation value is also reduced. In FIG. 7D, the spreading code and the timing are matched relative to the received data, but noise is superimposed on the received data, and the correlation value becomes smaller than the value in FIG. 7A.

Since some effects produced by noise along a communication path can not be avoided, generally, the correlation value is as shown in FIG. 7D. Therefore, large correlation effects can not be obtained by using the matched filter structure in FIG. 6. Therefore, as a countermeasure, an averaging process is employed. During this process, since, for the spreading spectrum modulation, data to be transmitted is multiplied by the same spreading code at a specific cycle, the correlation values of several cycles are calculated and added together (averaged), so that more reliable correlation results can be obtained.

In the actual process for digitizing a received signal, when the received signal is sampled at the chip rate for the spreading code while the timing is unknown, satisfactory process accuracy can not be expected. Thus, as a countermeasure, an oversampling method is generally employed. According to this method, the received signal is sampled at a sampling rate that is several times that of the chip rate, and for calculating the correlation value, multiple sampling results are obtained for one chip interval.

FIGS. 8A and 8B are diagrams for explaining the oversampling of a received signal. In FIG. 8A, the sampling rate is equal to the chip rate of the spreading code. In FIG. 8B, double oversampling is performed at a sampling rate that is twice that of the chip rate of the spreading code, and a sampling value that is twice that of the number of chips of spreading code is obtained as received data.

FIG. 9 is a diagram for explaining the configuration of a matched filter in the double over sampling process. The matched filter comprises: a tap section, wherein multiple taps 911 to 918 are connected in series to constitute a shift register; multipliers 921 to 928; and adders 931 to 937. In this embodiment, a matched filter of 8 taps is employed. However, if the double oversampling is to be employed for spreading code of 256 chips, 512 taps will be provided for the structure of the matched filter.

In the thus structured matched filter, data 901 obtained by the oversampling is transmitted while shifting the data 901 by one sample. The outputs of the taps 911 to 912 are the two sampling values at one chip intervals that are received last, and the outputs of the taps 913 and 914 are the two sampling values at one chip intervals that are previously received. In this manner, in the tap section, two sampling values obtained by sampling performed at two locations are arranged for each one chip interval.

The multipliers 921 to 928 multiply, for each chip, these sampling values for two phases by the spreading code generated by the code generator. The adders 931 to 937 add the multiplication products to obtain an output correlation value 902, which is the average for the received data obtained by the double oversampling. The maximum output correlation value 902 is attained when the received data and the timing of the spreading code most nearly match, and in this state, synchronization is obtained.

As is described above, by using the matched filter of the oversampling system, the correlation accuracy can be improved, compared with when the sampling is performed at the chip rate. However, since double oversampling is performed, it is apparent that the number of taps and the number of multipliers is doubled, and that, in order to constitute the matched filter, the number of adders is almost doubled.

For a matched filter of a k-times oversampling system, mk taps, mk multipliers and mk-1 adders are required when the number of chips for the spreading code is m, so that the required circuit size is about k times that required for the matched filter of a non-oversampling system.

As a first problem for the matched filter of an oversampling system, since the frequency of a sampling clock is increased and in a unit hour the amount of data to be shifted between taps is increased, there is a corresponding increase in power consumption. As a second problem, since the number of taps, the number of multipliers and the number of adders increase in proportion to the multiple of the oversampling times, the size of a LSI circuit is drastically increased.

A technique for a matched filter to resolve the first problem is disclosed in JP-A-2000-269855. According to this technique, instead of performing oversampling for data that is received by a k-times oversampling system, the k matched filters of the non-oversampling system shown in FIG. 6B are arranged in parallel, and an operating clock whose phase relative to a reference clock is delayed by a period n/k times the clock cycle is provided for the n-th matched filter.

Since with this technique a high speed operating clock is not required for the matched filter, a power consumption reduction is to be expected. However, since the circuit size does not become smaller than that provided for the matched filter of a k-times oversampling system, when compared with the matched filter of a non-oversampling system, k times the power consumption is required.

Furthermore, this technique provides no resolution for the second problem. And since on an LSI chip, such as is mounted in a CDMA handy telephone, the space occupied by a matched filter is extremely large, this is a factor that contributes greatly to unit cost. So that if a smaller LSI chip is available and is employed, in addition to a considerable power consumption reduction, an appreciable unit cost reduction can also be realized.

SUMMARY OF THE INVENTION

To resolve the conventional shortcomings, while focusing on the fact that for spreading data the use of the same code is periodically repeated, it is one objective of the present invention to provide a synchronization detection circuit wherein, for received data that is sampled at the same sampling rate as the chip rate for spreading code, the same correlation accuracy can be acquired as is available with the matched filter of an oversampling system, and wherein the size of the circuit corresponding to the matched filter is considerably reduced.

To achieve this objective, according to a first aspect of the invention, a synchronization detection circuit comprises: a matched filter (matched filter 105) for outputting a correlation value between a spreading code and data that is obtained by sampling a code spread signal using a one chip cycle sampling clock; a sampling clock generator (sampling clock generator 102) for generating the sampling clock by sequentially changing the phase for each predetermined phase period provided by a reference clock for a one chip cycle; and a synchronization determination unit (synchronization determination unit 107) for determining the timing whereat the maximum for the correlation value is attained, and for detecting synchronization.

According to the synchronization detection circuit of the first aspect, since the code spread data is sampled using the sampling clock, whose phase is changed for every predetermined phase period, the matched filter of a non-oversampling system need only be employed to obtain the correlation value for each phase. Therefore, while a circuit size as small as the synchronization detection circuit of a non-oversampling system is maintained, the same correlation accuracy is obtained as is acquired when the number of times oversampling is performed corresponds to the number of phases.

According to a second aspect of the invention, in the synchronization detection circuit of the first aspect, for every predetermined phase period, the phase delay for the sampling clock is sequentially increased a value obtained by dividing one chip period by an integer.

According to the synchronization detection circuit of the second aspect, the sampling clock is obtained for which the phase delay for the reference clock is increased by a value obtained by dividing one chip period by an integer. Therefore, the amount of data that is sampled each phase period is increased until it equals that sampled at each phase position using the oversampling method. Thus, the correlation values in the individual phase periods need only be added together to obtain a value that equals the correlation value obtained using the oversampling method.

According to a third aspect of the invention, in the synchronization detection circuit of the first or second aspect, the phase period is set so as to equal a cycle of a code spread signal.

According to the synchronization detection circuit of the third aspect, when the phase period is set so as to equal the cycle of a code spread signal, the correlation value can be obtained by changing, for each cycle, the phase for the sampling clock of the spreading code that is repetitively transmitted.

According to a fourth aspect of the invention, in the synchronization detection circuit of one of the first to third aspects, the synchronization determination unit employs a correlation value for the phase period to determine the timing whereat the maximum for the correlation value is attained.

According to the synchronization detection circuit of the fourth aspect, when the correlation values for the individual phase periods are employed to determine the timing whereat the maximum value for the correlation is attained, using an appropriate determination method, the detection of the synchronization can be determined within a shorter period.

According to a fifth aspect of the invention, in the synchronization detection circuit of one of the first to third aspects, the synchronization determination unit, to determine the timing whereat the maximum for the correlation value is attained, employs a value produced by adding together the correlation values for all the phase periods.

According to the synchronization detection circuit of the fifth aspect, when the value produced by adding together the correlation values for the individual phase periods is employed to determine the timing whereat the maximum for the correlation value is attained, the synchronization detection can be effected in the same manner as when the oversampling method is employed.

BRIEF DESCRIPTION OF THE DRAWINGS

FIG. 8 is a diagram for explaining the oversampling performed for a received signal; and FIG. 9 is a diagram for explaining the configuration of a matched filter for an oversampling system.

DETAILED DESCRIPTION OF THE PREFERRED EMBODIMENTS

One embodiment of the present invention will now be described while referring to the accompanying drawings.

Figure 1:
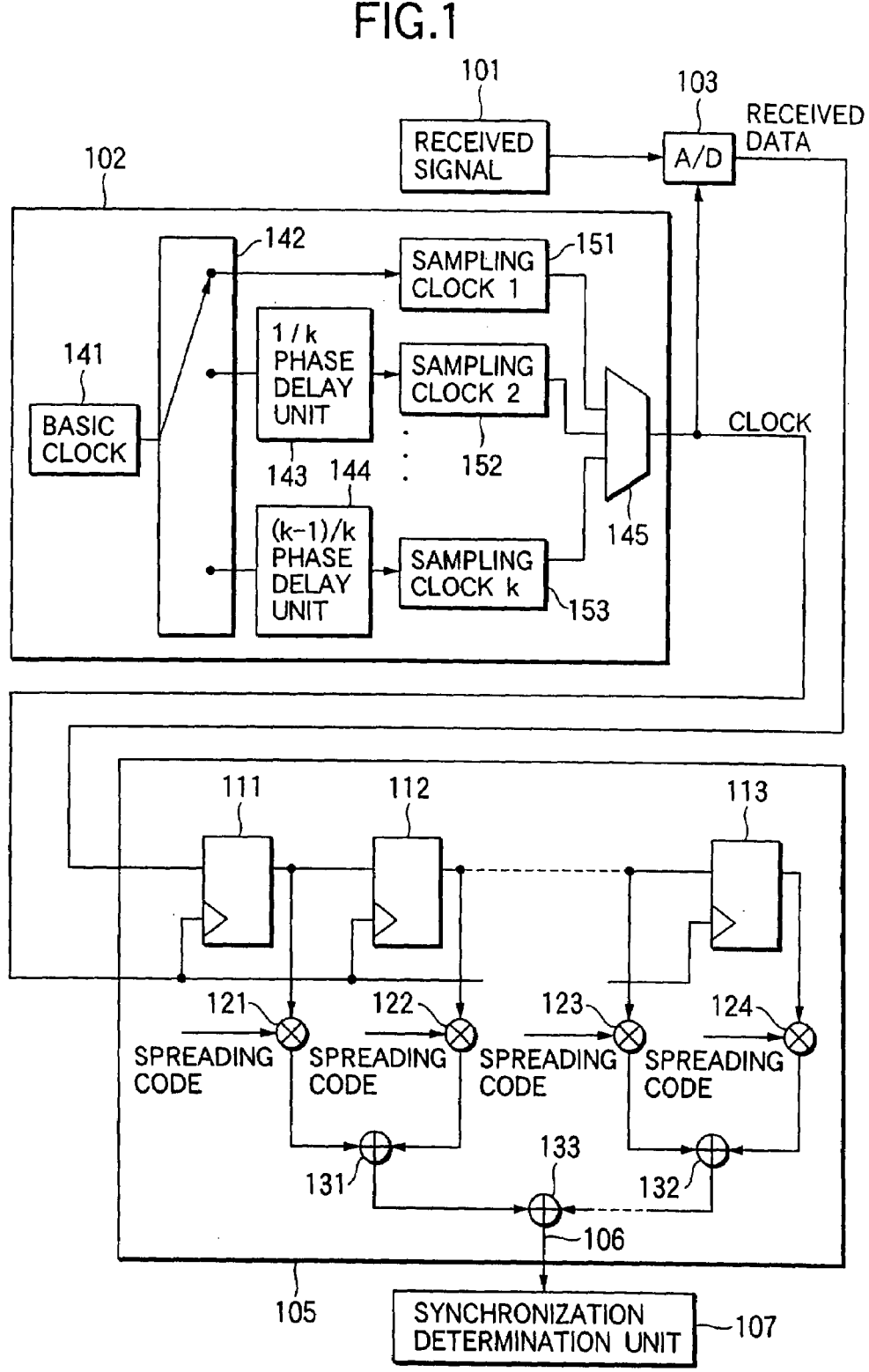
FIG. 1 is a block diagram showing the configuration of a synchronization detection circuit according to one embodiment of the present invention.

FIG. 1 is a block diagram showing the configuration of a synchronization detection circuit according to the embodiment of the present invention. In FIG. 1, the synchronization detection circuit comprises a sampling clock generator 102, a sampling unit 103 for sampling a received signal 101, a matched filter 105, and a synchronization determination unit 107 for determining the timing whereat the maximum for an output correlation value 106 is attained.

Figure 6A:
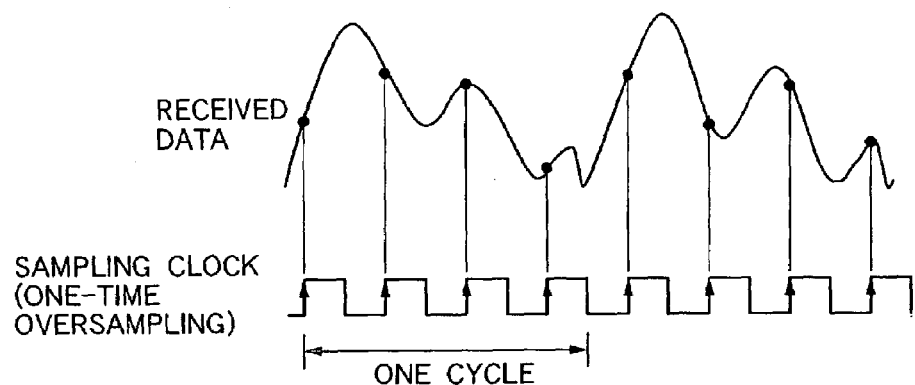
FIGS. 6A and 6B are diagrams for explaining the configuration of a matched filter.
Figure 6B:
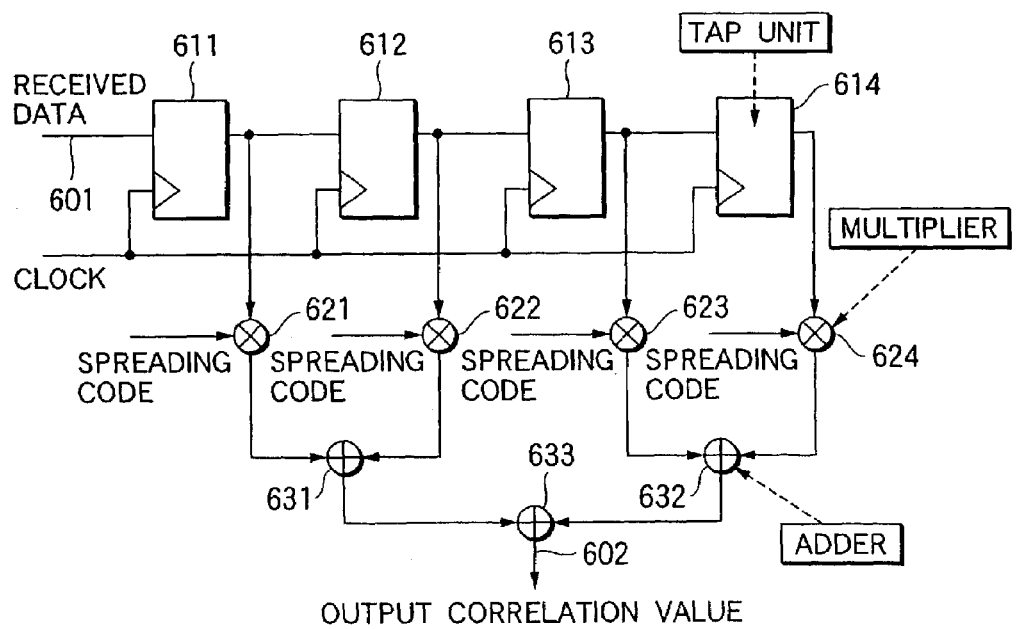
Figure 7A:
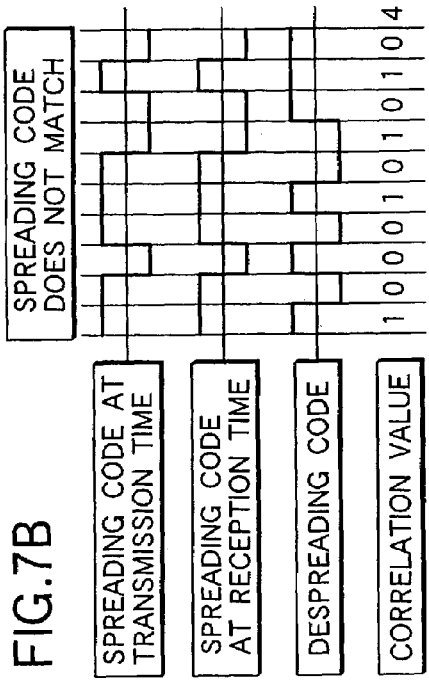
FIGS. 7A to 7D are diagrams for explaining the synchronization acquisition principle.
Figure 7B:
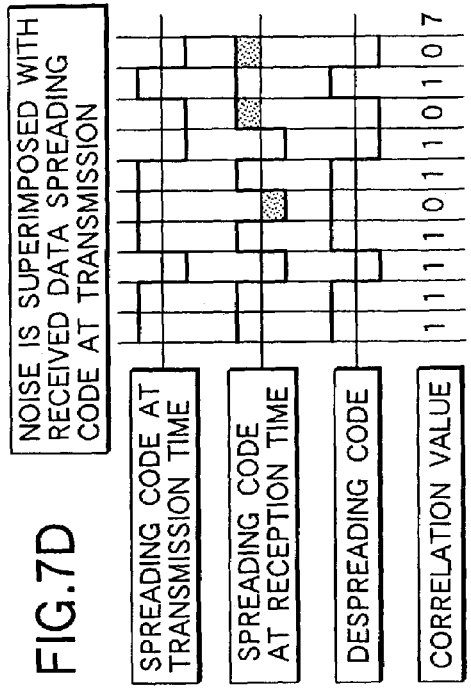
Figure 7C:
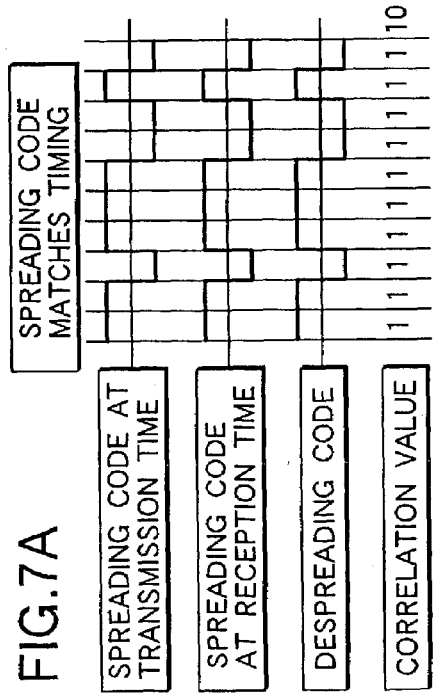
Figure 7D:
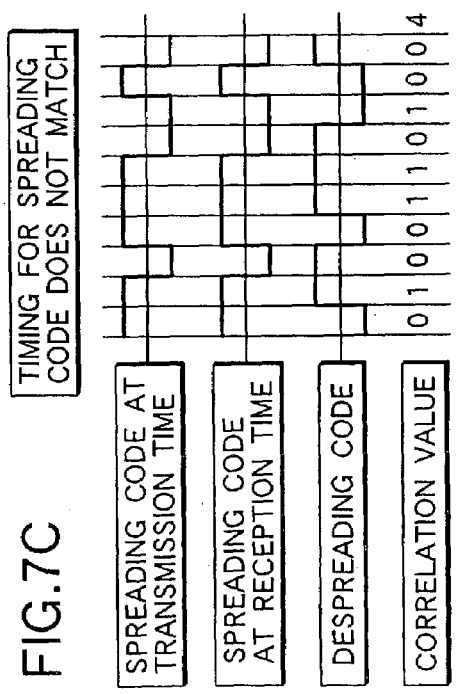

The matched filter 105 is for a non-oversampling system shown in FIG. 6B, and includes: a tap unit, wherein multiple taps 111 to 113 are connected in series to constitute a shift register; multipliers 121 to 124, whereby, for each chip, the output of the tap unit and a spreading code are multiplied; and adders 131 to 133, whereby the outputs of the multipliers 121 to 124 are added together.

The sampling clock generator 102 includes a basic clock 141; a switch 142 for distributing the basic clock 141; k-1 phase delay units extending from a ¼ phase delay unit 143 to a (k-1)/k phase delay unit 144; and an OR circuit 145. The k-1 phase delay units sequentially delay the received basic clock by increasing by 1/k phase a delay time for each clock, and generate clocks having a phase difference ranging from the 1/k phase to the (k-1)/k phase, i.e., from a sampling clock 2(152) to a sampling clock k(153). These generated sampling clocks, together with a sampling clock 1 (151), are transmitted to the sampling unit 103. The switch 142 is used to change a distribution destination for each repetitive spreading data period.

The received signal is sampled by the sampling unit 103, and the sampled data is transmitted as received data to the tap unit of the matched filter 105. In the matched filter 105, the multipliers 121 to 124 multiply the outputs of the taps by the spreading code generated by the code generator, and the adders 131 to 133 add together the multiplication products to obtain the output correlation value 106. The synchronization determination unit 107 stores obtained correlation value 106 in the memory, or adds the correlation value, and employs a predetermined determination method to determine the timing whereat the maximum for the correlation value 106 is attained.

Figure 2:
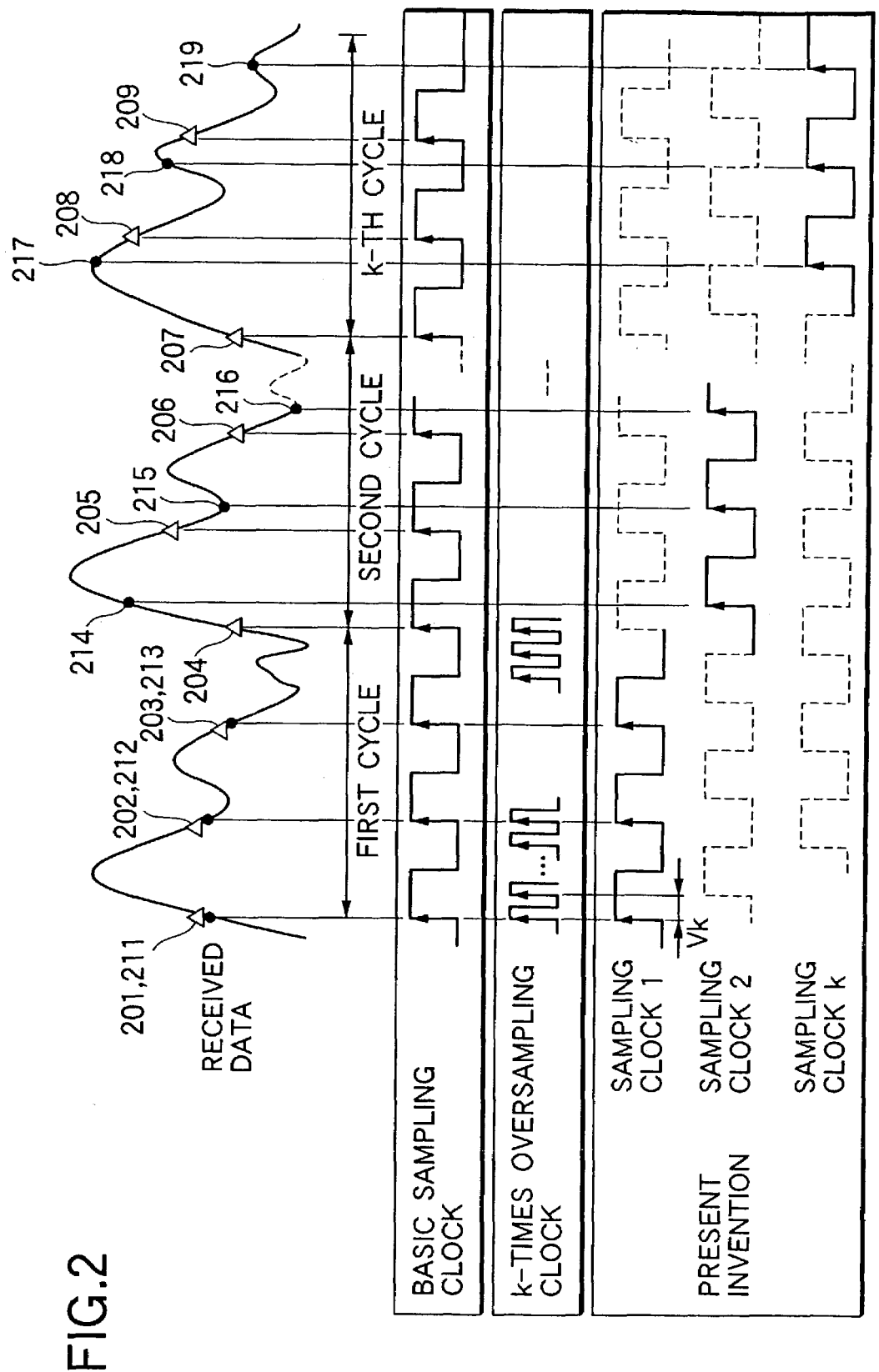
FIG. 2 is a diagram for explaining the process whereby the synchronization detection circuit of this embodiment obtains the same sampling value as is provided by the oversampling system.

FIG. 2 is a diagram for explaining the process wherein, although oversampling is not performed, the matched filter of this embodiment can obtain the sampling value for each phase of a k-times oversampling system. When no oversampling is performed as in the conventional case, sampling values 201 to 209 are obtained for the same phase at the individual cycles. Whereas, according to the matched filter of this embodiment, at the first, second and k-th cycles of the received signal, sampling values 211 to 219 are respectively obtained in accordance with a sampling clock 1, a sampling clock 2 and a sampling clock k.

Figure 3:
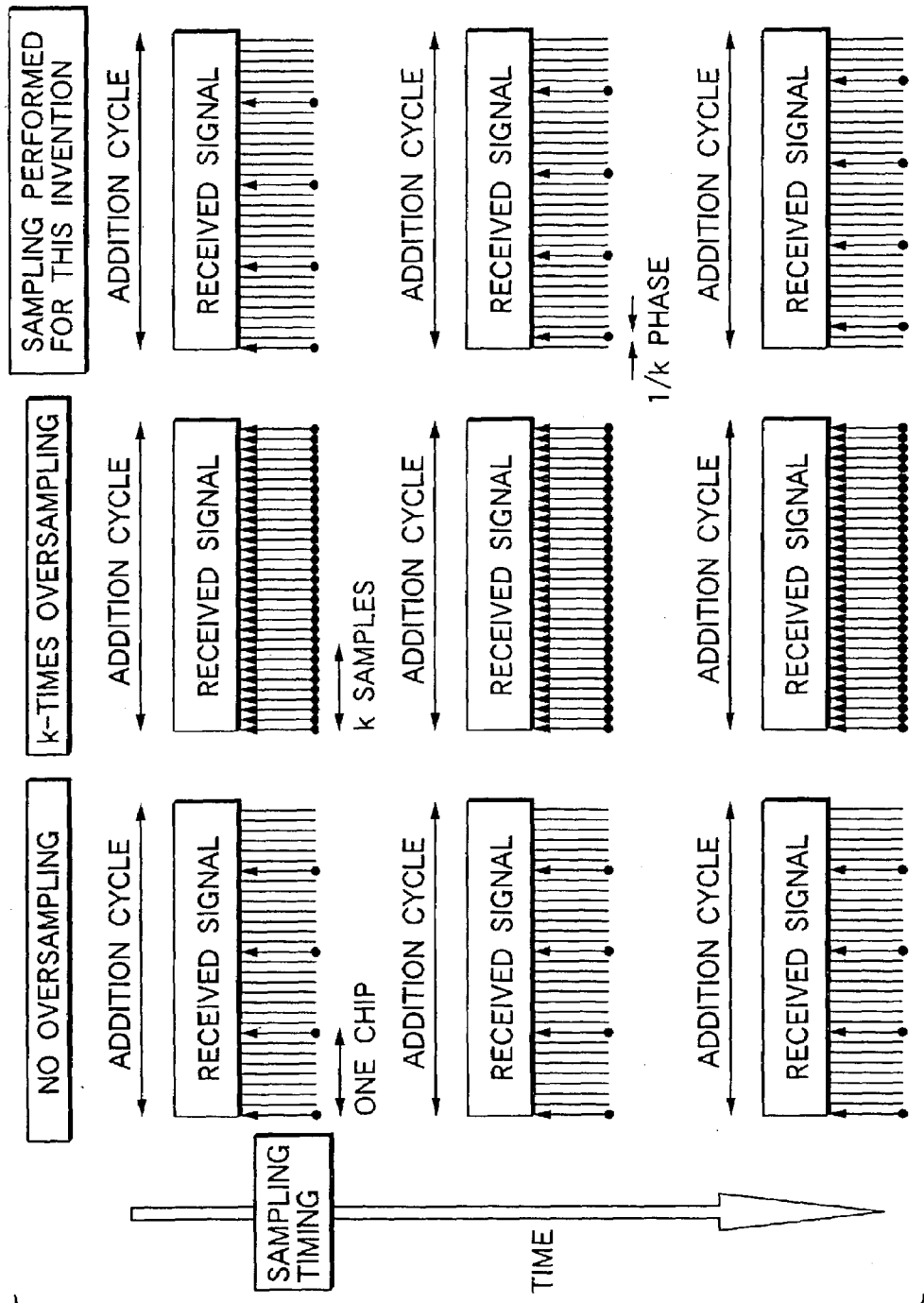
FIG. 3 is a diagram wherein, by comparing individual methods, an explanation is provided for the timing whereat sampling values are obtained.
Figure 4:
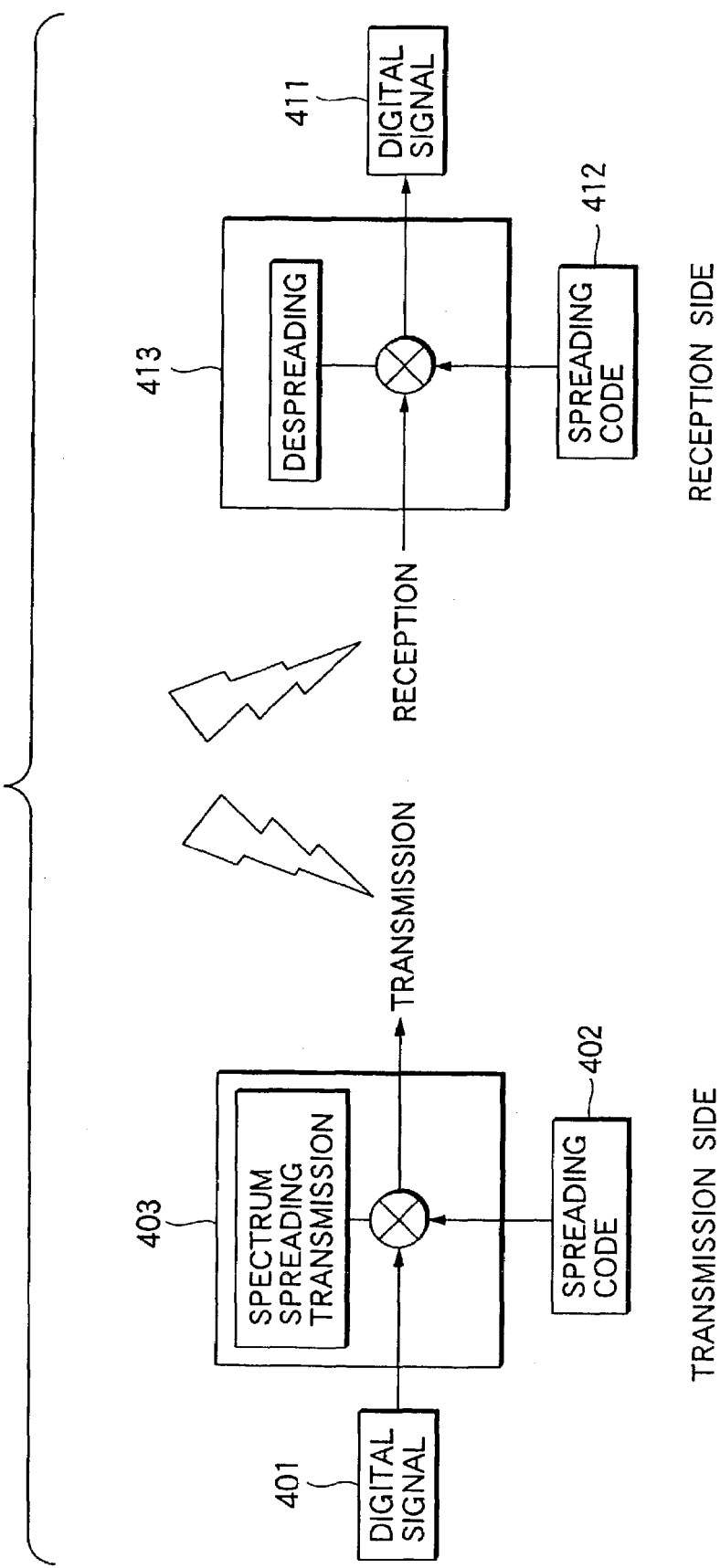
FIG. 4 is a diagram showing the concept of a spread spectrum direct-sequence system for spread spectrum communication.
Figure 5:
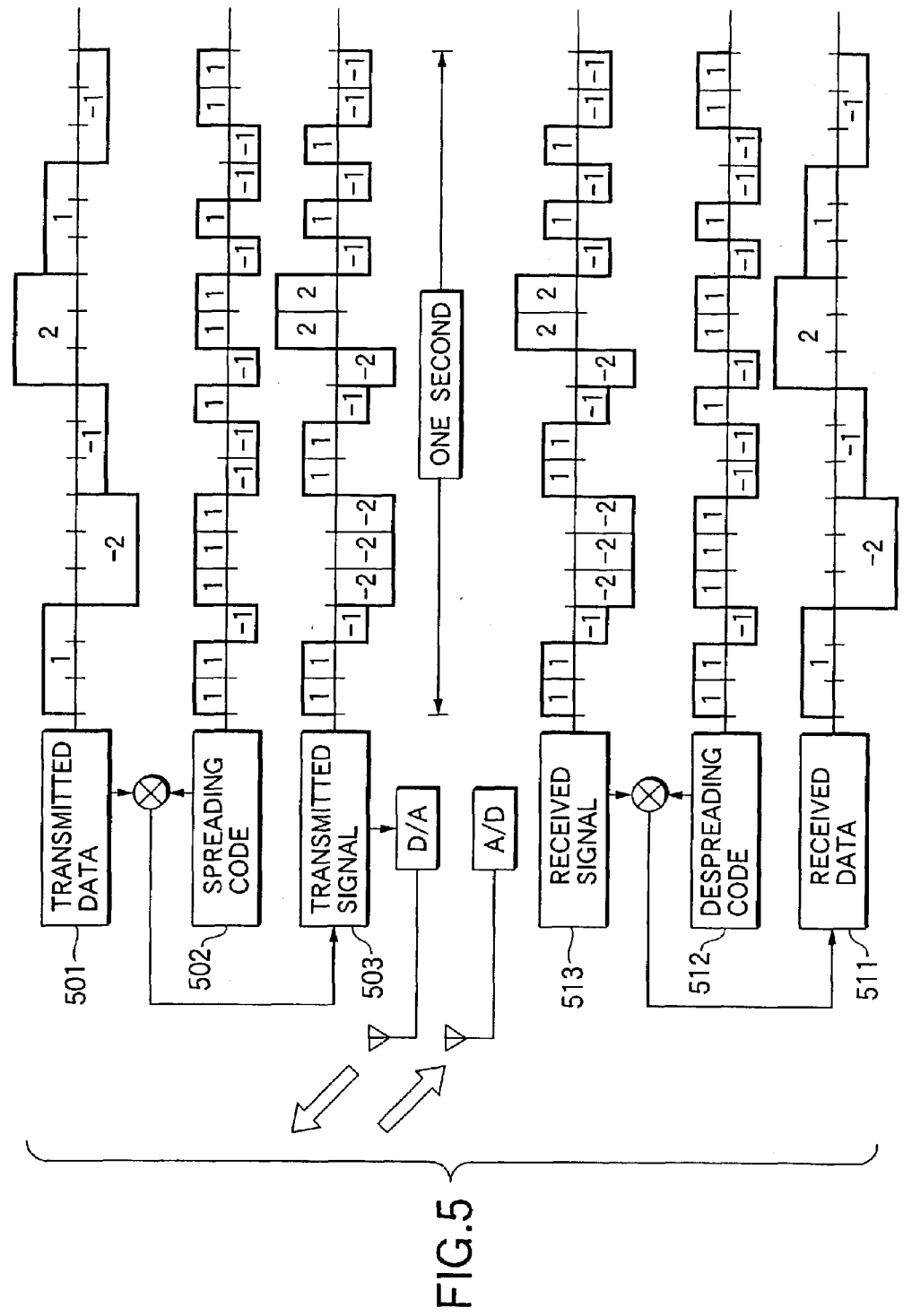
FIG. 5 is a conceptual diagram for explaining the principle for spectrum spreading modulation and spectrum dispreading.

FIG. 3 is a detailed comparison diagram showing the timings for obtaining the sampling value using the conventional non-oversampling method, the k-times oversampling method and the sampling method for this embodiment. As is apparent from FIG. 3, although oversampling is not performed in this embodiment, a sampling value whose phase is delayed by 1/k of the clock cycle is obtained at the basic clock rate for each repetitive spreading data period.

Through this process, the correlation value between the sampling value and the spreading code is obtained for each repetitive spreading data period. Then, when the output correlation values for all the individual phases are added together, the value obtained by the addition equals the output correlation value provided by the matched filter for the oversampling method. In this embodiment, since an output correlation value is obtained for each phase, it is apparent that the matched filter of this embodiment is more effective than the matched filter for the oversampling method.

Furthermore, the output correlation value for each phase matches the output correlation value for each of the k matched filters in JP-A-2000-269855 that are arranged in parallel. As is described above, according to the embodiment, at the least, the same correlation accuracy can be obtained as is provided by the matched filter of the oversampling method, and the size of the circuit of the matched filter can be considerably reduced.

As is described above, according to the embodiment, even when the matched filter of a non-oversampling method is employed, between the spreading code and the data that is sampled at the sampling clock whose phase, a correlation value that is sequentially changed is obtained for each phase cycle. Thus, while the circuit size can be maintained so that it is as small as the synchronization detection circuit of a non-oversampling system, a correlation value can be obtained that is as accurate as that provided when the number of times oversampling is performed is the equivalent of the phase count.

As a result, it is possible to resolve the oversampling system problems, i.e., the increase in the power consumption occasioned by an increase in the frequency of the sampling clock, and the drastic, proportional increase in the area of an LSI occasioned by the need to increase the circuit size to perform multiple oversamplings. In addition, the cost of the LSI chip used for the processing can be reduced, dramatically.

What is claimed is:

1. A synchronization detection circuit comprising:
   a matched filter for outputting a correlation value between a spreading code and data that is obtained by sampling a code spread signal using a one chip cycle sampling clock;
   a sampling clock generator for receiving a reference clock having a one chip cycle and generating said sampling clock by changing the phase of the reference clock at each predetermined phase period; and
   a synchronization determination unit for determining the timing whereat the maximum for said correlation value is attained, and for detecting synchronization, wherein
   the sampling clock generator comprises a plurality of delay units receiving the reference clock for producing sampling signals with phases different from each other, and a selector for selecting, in rotation, one of the sampling signals as said sampling clock at each predetermined phase period.

2. A synchronization detection circuit according to claim 1, wherein, for every predetermined phase period, the phase delay for said sampling clock is sequentially increased by a value obtained by dividing one chip period by an integer.

3. A synchronization detection circuit according to claim 1, wherein said phase period is set so as to equal a cycle of a code spread signal.

4. A synchronization detection circuit according to claim 2, wherein said phase period is set so as to equal a cycle of a code spread signal.

5. A synchronization detection circuit according to claim 1, wherein said synchronization determination unit employs a correlation value for said phase period to determine the timing whereat the maximum for said correlation value is attained.

6. A synchronization detection circuit according to claim 2, wherein said synchronization determination unit employs a correlation value for said phase period to determine the timing whereat the maximum for said correlation value is attained.

7. A synchronization detection circuit according to claim 1, wherein said synchronization determination unit, to determine the timing whereat the maximum for said correlation value is attained, employs a value produced by adding together said correlation values for all the phase periods.

8. A synchronization detection circuit according to claim 2, wherein said synchronization determination unit, to determine the timing whereat the maximum for said correlation value is attained, employs a value produced by adding together said correlation values for all the phase periods.

* * * * *